United States Patent
Willocq et al.

(10) Patent No.: US 10,618,987 B2
(45) Date of Patent: Apr. 14, 2020

(54) MODIFIED CATALYST SUPPORTS

(71) Applicant: TOTAL RESEARCH & TECHNOLOGY FELUY, Seneffe (Feluy) (BE)

(72) Inventors: Christopher Willocq, Bousval (BE); Aurélien Vantomme, Bois-de-Villers (BE); Martine Slawinski, Nivelles (BE)

(73) Assignee: TOTAL RESEARCH & TECHNOLOGY FELUY, Seneffe (BE)

( * ) Notice: Subject to any disclaimer, the term of this patent is extended or adjusted under 35 U.S.C. 154(b) by 0 days.

(21) Appl. No.: 16/262,514

(22) Filed: Jan. 30, 2019

(65) Prior Publication Data
US 2019/0161565 A1    May 30, 2019

Related U.S. Application Data

(62) Division of application No. 13/807,559, filed as application No. PCT/EP2011/061146 on Jul. 1, 2011, now Pat. No. 10,233,268.

(30) Foreign Application Priority Data

Jul. 1, 2010   (EP) .................................. 10168151
Aug. 12, 2010  (EP) .................................. 10172640

(51) Int. Cl.
*C08F 110/02*    (2006.01)
*C08F 210/00*    (2006.01)
(Continued)

(52) U.S. Cl.
CPC .......... *C08F 110/02* (2013.01); *C08F 210/00* (2013.01); *B01J 21/08* (2013.01); *B01J 31/0212* (2013.01); *B01J 31/122* (2013.01); *B01J 31/143* (2013.01); *B01J 31/2295* (2013.01); *B01J 2531/46* (2013.01); *B01J 2531/48* (2013.01); *B01J 2531/49* (2013.01);
(Continued)

(58) Field of Classification Search
USPC ........................................................ 526/114
See application file for complete search history.

(56) References Cited

U.S. PATENT DOCUMENTS

| | | | |
|---|---|---|---|
| 2003/0232716 A1* | 12/2003 | McDaniel | C08F 10/00 502/115 |
| 2007/0299222 A1* | 12/2007 | Thorman | C08F 10/00 526/130 |

* cited by examiner

*Primary Examiner* — Fred M Teskin
(74) *Attorney, Agent, or Firm* — Albert Shung

(57) ABSTRACT

The invention covers a supported catalyst system prepared according to a process comprising the following step:

i). impregnating a silica-containing catalyst support having a specific surface area of from 150 $m^2/g$ to 800 $m^2/g$, preferably 280 $m^2/g$ to 600 $m^2/g$, with one or more titanium compounds of the general formula selected from $R_n Ti(OR')_m$ and $(RO)_n Ti(OR')_m$, wherein R and R' are the same or different and are selected from hydrocarbyl groups containing from 1 to 12 carbon and halogens, and wherein n is 0 to 4, m is 0 to 4 and m+n equals 4, to form a titanated silica-containing catalyst support having a Ti content of at least 0.1 wt % based on the weight of the Ti-impregnated catalyst support wherein the supported catalyst system further comprises an alumoxane and a metallocene.

27 Claims, 1 Drawing Sheet

(51) Int. Cl.
_C08F 4/642_ (2006.01)
_C08F 4/6592_ (2006.01)
_B01J 21/08_ (2006.01)
_B01J 31/02_ (2006.01)
_B01J 31/12_ (2006.01)
_B01J 31/14_ (2006.01)
_B01J 31/22_ (2006.01)
_C08F 4/659_ (2006.01)
_C08F 110/06_ (2006.01)
_C08F 210/16_ (2006.01)

(52) U.S. Cl.
CPC ....... _B01J 2531/56_ (2013.01); _C08F 4/65912_ (2013.01); _C08F 4/65927_ (2013.01); _C08F 110/06_ (2013.01); _C08F 210/16_ (2013.01)

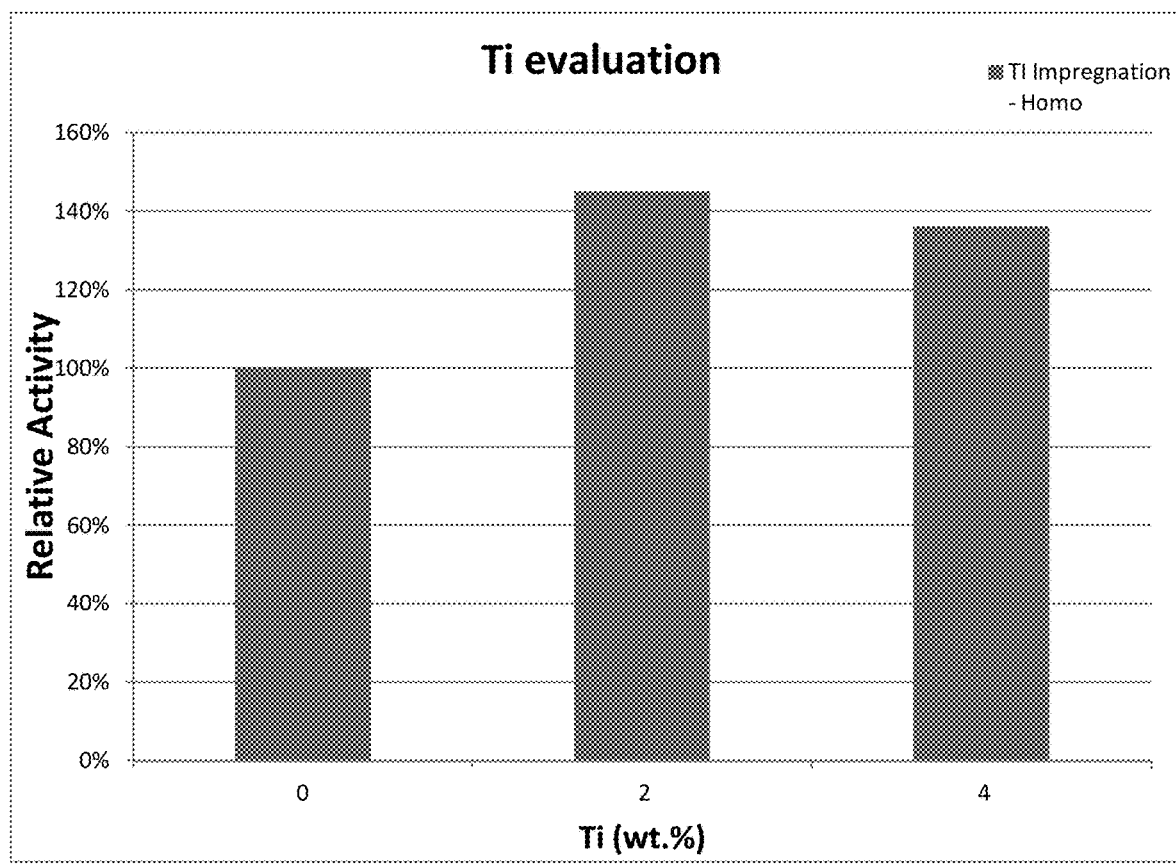

MODIFIED CATALYST SUPPORTS

CROSS-REFERENCE TO RELATED APPLICATIONS

This application is a divisional of U.S. patent application Ser. No. 13/807,559, filed Apr. 15, 2013, which claims the benefit of PCT/EP2011/061146, filed Jul. 1, 2011, which claims priority from EP 10168151.8, filed Jul. 1, 2010 and EP 10172640.4 filed Aug. 12, 2010, which are herein incorporated by reference in their entireties for all purposes.

FIELD OF THE INVENTION

The invention relates to a process for preparing modified catalyst supports, in particular catalyst supports suitable for metallocene catalyst systems.

The invention also relates to the support obtained according to this process, as well as a catalyst system comprising such a support and the olefin polymerisation process using such a support.

BACKGROUND OF THE INVENTION

Metallocene catalyst systems are extensively used in a variety of polymerisation systems, including the polymerisation of olefins. Generally, in order to obtain the highest activity from metallocene catalysts, it has been necessary to use them with an organoaluminoxane activating agent, such as methylaluminoxane (MAO). This resulting catalyst system is generally referred to as a homogenous catalyst system since at least part of the metallocene or the organoaluminoxane is in solution in the polymerisation media. These homogenous catalyst systems have the disadvantage that when they are used under slurry polymerisation conditions, they produce polymers which stick to the reactor walls during the polymerisation process (generally referred to as "fouling") and/or polymers having small particle size and low bulk density which limit their commercial utility.

Various methods have been proposed in an effort to overcome the disadvantages of the homogenous metallocene catalyst systems. Typically, these procedures have involved the prepolymerisation of the metallocene aluminoxane catalyst system and/or supporting the catalyst system components on a porous carrier (also known as a "particulate solid" or "support"). The porous carrier is usually a silica-containing support.

Another important consideration in the development of metallocene catalysts is the yield of solid polymer that is obtained by employing a given quantity of catalyst in a given amount of time. This is known as the "activity" of the catalyst. There is an ongoing search for metallocene catalysts and techniques for preparing such catalysts which give improved activity for the polymerisation of olefins. An improved activity means that less catalyst needs to be used to polymerise more olefins, thereby reducing the costs considerably, since metallocenes are more expensive than Ziegler-Natta and chromium catalysts.

Several attempts have been made to titanate silica supports for use in metallocene catalysed ethylene polymerisations. Jongsomjit et al. (Molecules 2005, 10, 672, Ind. Eng. Chem. Res. 2005, 44, 9059 and Catalysis Letters Vol. 100, Nos. 3-4, April 2005) discloses the titanation of silicas for zirconocene catalysed ethylene polymerisation, wherein the support is prepared according to Conway et al. (J. Chem. Soc., Faraday Trans. J, 1989, 85(1), 71-78) using mixed supports of titania and silica mixed-oxide supports. The increase in activity with such a support is only of 25%, because the titania is present predominantly in its anatase form i.e. a crystalline form. Under polymerisation conditions, little morphological control can be obtained with such a support. It is particularly difficult to use industrially, since the porous volume, bulk density and particle size of both the silica and titania need to be similar in order to avoid decantation of one with respect to the other. In addition, the interaction of the Ti with the actives sites is not optimized.

Thus, a new catalyst support is needed for metallocene catalysts which can induce improved activity of the metallocene catalyst system, particularly under industrial conditions.

An object of the present invention is to provide a new catalyst support for metallocene catalysts to increase their activity.

Furthermore, it is an object of the present invention to provide a new method for polymerising olefins, preferably ethylene and propylene, using a new supported metallocene catalyst system.

SUMMARY OF THE INVENTION

At least one of the objects is solved by the present invention.

A supported catalyst system is provided obtainable by a process comprising the following step:
  i) titanating a silica-containing catalyst support having a specific surface area of from 150 m²/g to 800 m²/g, preferably 280 to 600 m²/g, more preferably 280 m²/g to 400 m²/g, by impregnating the support with a titanium compound of the general formula selected from $R_n Ti(OR')_m$ and $(RO)_n Ti(OR')_m$, wherein R and R' are the same or different and are selected from hydrocarbyl groups containing from 1 to 12 carbon and halogens, preferably chlorine and fluorine, and wherein n is 0 to 4, m is 0 to 4 and m+n equals 4, to form a titanated silica-containing catalyst support having a Ti wt % of at least 0.1 wt % wherein the supported catalyst system further comprises an alumoxane and a metallocene.

The supported catalyst system may further comprise the following step after step (i):
  ii) treating the titanated support with a catalyst activating agent, preferably an alumoxane.

The process may further comprise the following step during or after step (ii):
  iii) treating the titanated support with a metallocene.

There is also provided a process for preparing a polyethylene comprising the step of polymerising olefins, preferably ethylene or propylene, in the presence of a supported catalyst system according to the invention, preferably in the gas phase or in the slurry phase. Optionally, in the case of ethylene polymerization, the ethylene is copolymerised with one or more alpha-olefin comonomers selected from C3 to C12 alpha-olefins. Optionally, in the case of propylene polymerization, the propylene is copolymerized with one or more alpha olefin comonomers selected from ethylene, and C4 to C12 alpha-olefins.

The polyethylene obtainable by the process of the invention is also new and inventive and has surprising rheological properties.

Surprisingly the catalyst support according to the invention improves the activity of the metallocene deposited thereon, since the interaction of the Ti within the support is optimized. It is believed, without being bound to theory, that the titanation step according to the invention by impregnation rather than simple physical mixing of oxides, causes the titanium compound to form Si—O—Ti—OH on the surface of the pores within the silica support even before alumoxane (e.g. MAO) addition. Furthermore, once an alumoxane is added, its interaction with TiOH and SiOH is optimized. The electronic effect of the specific Ti distribution on the catalyst grain surface increases the metallocene catalyst system's activity as well.

BRIEF DESCRIPTION OF THE DRAWINGS

FIG. 1 represents a comparison of the catalytic activities of the metallocene catalyst system comprising the titanium compound added according to the invention containing a titanium content of 2 wt % and 4 wt % according to the invention with the catalytic activities of metallocene catalyst systems not containing any titanium.

DETAILED DESCRIPTION OF THE INVENTION

The present invention relates to a process for preparing a silica-containing catalyst support, for preparing the catalyst system prepared with said support and for the production of polyolefins with said catalyst system. The support according to the invention is particularly suitable for metallocene catalyst polymerisations, since it increases the activity of the metallocene catalyst system considerably.

Suitable supports used in this invention are silica-based and comprise amorphous silica having a surface area of at least 150 m$^2$/g, preferably of at least 200 m$^2$/g, more preferably of at least 280 m$^2$/g, and at most 800 m$^2$/g, preferably to at most 600 m$^2$/g, more preferably to at most 400 m$^2$/g and more preferably to at most 380 m$^2$/g. The specific surface area is measured by N$_2$ adsorption using the well-known BET technique.

Silica-containing supports contain at least 20, 40, or 50% by weight of amorphous silica. The silica-containing support may also contain one or more of alumina, magnesia, zirconia and the like.

Preferably the support is a silica support i.e. essentially 100% by weight of silica, or a silica-alumina support. In the case of silica-alumina supports, the support preferably comprises at most 15% by weight of alumina.

In general, the supports advantageously have a pore volume of 1 cm$^3$/g to 3 cm$^3$/g. Supports with a pore volume of 1.3-2.0 cm$^3$/g are preferred. Pore volume is measured by N$_2$ desorption using the BJH method for pores with a diameter of less than 1000 Å. Supports with too small a porosity may result in a loss of melt index potential and in lower activity. Supports with a pore volume of over 2.5 cm$^3$/g or even with a pore volume of over 2.0 cm$^3$/g are less desirable because they may require special expensive preparation steps (e.g. azeotropic drying) during their synthesis. In addition, because they are usually more sensitive to attrition during catalyst handling, activation or use in polymerisation, these supports often lead to more polymer fines production, which is detrimental in an industrial process.

The silica-containing support can be prepared by various known techniques such as but not limited to gelification, precipitation and/or spray-drying. Usually, the particle size D50 is from 5 µm, preferably from 30 µm and more preferably from 35 µm, up to 150 µm, preferably up to 100 µm and most preferably up to 70 µm. D50 is defined as the particle diameter, where 50 wt-% of particles have a smaller diameter and 50 wt-% of particles have a larger diameter. Particle size D90 is up to 200 µm, preferably up to 150 µm, most preferably up to 110 µm. D90 is defined as the particle diameter where 90 wt-% of particles have a smaller diameter and 10 wt-% of particles have a larger diameter. Particle size D10 is at least 2 µm, preferably at least 5 µm. D10 is defined as the particle diameter where 10 wt-% of particles have a smaller diameter and 90 wt-% of particles have a larger diameter. Particle size distribution is determined using light diffraction granulometry, for example, using the Malvern Mastersizer 2000. The particle morphology is preferably microspheroidal to favour fluidisation and to reduce attrition.

The silica-containing support is loaded with one or more titanium compounds selected from R$_n$Ti(OR')$_m$ and (RO)$_n$Ti (OR')$_m$, wherein R and R' are the same or different and are selected from hydrocarbyl groups containing from 1 to 12 carbon and halogens, preferably chlorine and fluorine, and wherein n is 0 to 4, m is 0 to 4 and m+n equals 4. From the halogens any element from Group VIIa can be selected. The titanium compound is preferably selected from the group consisting of tetraalkoxides of titanium having the general formula Ti(OR')$_4$ wherein each R is the same or different and can be an alkyl or cycloalkyl group each having from 3 to 5 carbon atoms, and mixtures thereof.

The titanium compound(s) with which the support is impregnated is more preferably selected from alkyl titanates, preferably selected from e.g. Ti(OC$_4$H$_9$)$_4$, Ti(OC$_3$H$_7$)$_4$. More preferably a mixture of alkyl titanates are used e.g. a mixture of Ti(OC$_4$H$_9$)$_4$ and Ti(OC$_3$H$_7$)$_4$. Most preferably the mixture has a weight ratio of 20/80 of Ti(OC$_4$H$_9$)$_4$ to Ti(OC$_3$H$_7$)$_4$. The impregnation of the support with akyl titanate is preferably performed by introducing the titanium compound(s) in a suspension in a diluent such as an organic solvent e.g. hexane or iso-hexane, or dissolved in an aqueous solvent. The suspension is preferably added drop wise to the support. The suspension is then mixed preferably for at least 1 hour, more preferably at least 2 hours.

The total amount of titanium compound(s) used to impregnated is calculated in order to obtain the required titanium content in the resultant catalyst support and preferably the progressive flow rate of the titanium compound is adjusted in order to provide a titanation reaction period of 0.5 to 2 hours. The resulting impregnated support has a Ti content of from 0.1 to 60 wt %, preferably 0.1 to 25 wt %, more preferably 0.5 to 15 wt %, most preferably 1 to 10 wt %.

The supported catalyst system obtainable by this process may further comprise the step:
   drying the Ti-impregnated catalyst support prior to the addition of alumoxane and metallocene.

The support is dried after titanation, preferably by heating to a temperature of from 100° C., preferably of at least 250° C., more preferably of at least 270° C. This step generally lasts for at least 1 hour, more preferably at least 2 hours, most preferably at least 4 hours. The drying can take place in an atmosphere of dry and inert gas and/or air, preferably nitrogen. The drying may be carried out in a fluidised bed.

After impregnation and optional drying the titanated catalyst support can be stored under a dry and inert atmosphere, for example, nitrogen, at ambient temperature.

The details and embodiments mentioned above in connection with the process for manufacturing the catalyst support also apply with respect to the preparation of the supported catalyst system according to the present invention.

The supported catalyst system obtainable by the process of the invention may further comprise the step:

adding alumoxane to the Ti-impregnated catalyst support prior to or during the addition of metallocene.

The catalyst support is treated with a catalyst activating agent after impregnation. In a preferred embodiment, alumoxane or a mixture of alumoxanes are used as an activating agent for the metallocene, but any other activating agent known in the art can be used e.g. borane compounds. The alumoxane can be used in conjunction with the metallocene in order to improve the activity of the catalyst system during the polymerisation reaction. As used herein, the term alumoxane is used interchangeably with aluminoxane and refers to a substance, which is capable of activating the metallocene.

Alumoxanes used in accordance with the present invention comprise oligomeric linear and/or cyclic alkyl alumoxanes. In an embodiment, the invention provides a process wherein said alumoxane has formula (III) or (IV)

R—(Al(R)—O)$_x$—AlR$_2$ (III) for oligomeric, linear alumoxanes; or (—Al(R)—O—)$_y$ (IV) for oligomeric, cyclic alumoxanes wherein x is 1-40, and preferably 10-20;
wherein y is 3-40, and preferably 3-20; and
wherein each R is independently selected from a $C_1$-$C_8$ alkyl, and preferably is methyl.

In a preferred embodiment, the alumoxane is methylalumoxane (MAO). Generally, in the preparation of alumoxanes from, for example, aluminum trimethyl and water, a mixture of linear and cyclic compounds is obtained. Methods for manufacturing alumoxane are known in the art and will therefore not be disclosed in detail herein.

The treatment of the catalyst support with the alumoxane can be carried out according to any known method known by the person skilled in the art. Advantageously, the alumoxane, preferably MAO, is mixed in an inert diluent/solvent, preferably toluene, with the catalyst support. Alumoxane deposition preferably occurs at a temperature between 60° C. to 120° C., more preferably 80° C. to 120° C., most preferably 100 to 120° C. The amount of MAO is calculated to reach the desired aluminium loading.

The catalyst support is treated with a metallocene either during treatment with the catalyst activating agent (1-pot method) or thereafter. Any metallocene known in the art can be applied, including a mixture of different metallocenes. As used herein, the term "metallocene" refers to a transition metal complex with a coordinated structure, consisting of a metal atom bonded to one or more ligands. The metallocene are used according to the invention is preferably chosen from formula (I) or (II):

(Ar)$_2$MQ$_2$ (I); or

R"(Ar)$_2$MQ$_2$ (II)

wherein the metallocenes according to formula (I) are non-bridged metallocenes and the metallocenes according to formula (II) are bridged metallocenes;
wherein said metallocene according to formula (I) or (II) has two Ar bound to M which can be the same or different from each other;
wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P;
wherein M is a transition metal M selected from the group consisting of titanium, zirconium, hafnium and vanadium; and preferably is zirconium;
wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F and P; and
wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group comprising a hydrocarbyl having 1 to 20 carbon atoms and wherein said hydrocarbyl optionally contains one or more atoms selected from the group comprising B, Si, S, O, F and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof.

Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

Exemplary halogen atoms include chlorine, bromine, fluorine and iodine and of these halogen atoms, chlorine is preferred.

Exemplary hydrocarboxy groups are methoxy, ethoxy, propoxy, butoxy, and amyloxy.

In accordance with the present invention, a process is provided wherein ethylene monomer is polymerised in the presence of a bridged or non-bridged metallocene. "Bridged metallocenes" as used herein, are metallocenes in which the two aromatic transition metal ligands, denoted as Ar in formula (I) and (II) are covalently linked or connected by means of a structural bridge. Such a structural bridge, denoted as R" in formula (I) and (II) imparts stereorigidity on the metallocene, i.e. the free movement of the metal ligands is restricted. According to the invention, the bridged metallocene consists of a meso or racemic stereoisomer.

The two Ar can be the same or different. In a preferred embodiment the two Ar are both indenyl or both tetrahydroindenyl wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P. If substituted, both Ar are preferably identically substituted. However, in a preferred embodiment, both Ar are unsubstituted.

In a preferred embodiment, the metallocene used in a process according to the invention is represented by formula (I) or (II) as given above,
wherein Ar is as defined above, and wherein both Ar are the same and are selected from the group consisting of cyclopentadienyl, indenyl, tetrahydroindenyl and fluorenyl, wherein each of said groups may be optionally substituted with one or more substituents each independently selected from the group consisting of halogen and a hydrocarbyl having 1 to 20 carbon atoms as defined herein;

wherein M is as defined above, and preferably is zirconium, wherein Q is as defined above, and preferably both Q are the same and are selected from the group consisting of chloride, fluoride and methyl, and preferably are chloride; and and wherein R" when present, is as defined above and preferably is selected from the group consisting of a $C_1$-$C_{20}$ alkylene, and a silicon, and wherein said R" is optionally substituted with one or more substituents each independently selected from the group comprising a halogen, hydrosilyl, hydrocarbyl having 1 to 20 carbon atoms as defined herein.

In another preferred embodiment, the metallocene used in a process according to the invention is represented by formula (I) or (II) as given above, wherein Ar is as defined above, and wherein both Ar are different and are selected from the group consisting of cyclopentadienyl, indenyl, tetrahydroindenyl and fluorenyl, wherein each of said groups may be optionally substituted with one or more substituents each independently selected from the group consisting of, halogen and a hydrocarbyl having 1 to 20 carbon atoms as defined herein;

wherein M is as defined above, and preferably is zirconium, wherein Q is as defined above, and preferably both Q are the same and are selected from the group consisting of chloride, fluoride and methyl, and preferably are chloride; and and wherein R" when present is as defined above and preferably is selected from the group consisting of a $C_1$-$C_{20}$ alkylene, and a silicon, and wherein said R" is optionally substituted with one or more substituents each independently selected from the group comprising a hydrocarbyl having 1 to 20 carbon atoms as defined herein.

In an embodiment, the invention provides a process wherein said metallocene is an unbridged metallocene.

In a preferred embodiment, the invention provides a process wherein said metallocene is an unbridged metallocene selected from the group comprising bis(iso-butylcyclopentadienyl) zirconium dichloride, bis(pentamethylcyclopentadienyl) zirconium dichloride, bis(tetrahydroindenyl) zirconium dichloride, bis(indenyl) zirconium dichloride, bis(1,3-dimethylcyclopentadienyl) zirconium dichloride, bis(methylcyclopentadienyl) zirconium dichloride, bis(n-butyl-cyclopentadienyl) zirconium dichloride, and bis(cyclopentadienyl) zirconium dichloride; and preferably selected from the group comprising bis(cyclopentadienyl) zirconium dichloride, bis(tetrahydroindenyl) zirconium dichloride, bis(indenyl) zirconium dichloride, and bis(1-methyl-3-butyl-cyclopentadienyl)zirconium dichloride.

In another embodiment, the invention provides a process wherein said metallocene is a bridged metallocene.

In a preferred embodiment, the invention provides a process wherein said metallocene is a bridged metallocene selected from the group comprising ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, dimethylsilylene bis(2-methyl-1H-cyclopenta[a]naphthalen-3-yl) zirconium dichloride, cyclohexylmethylsilylene bis[4-(4-tert-butylphenyl)-2-methyl-inden-1-yl] zirconium dichloride, dimethylsilylene bis[4-(4-tert-butylphenyl)-2-(cyclohexylmethyl)inden-1-yl] zirconium dichloride. Ethylenebis(4,5,6,7-tetrahydro-1-indenyl) zirconium dichloride is particularly preferred.

In another preferred embodiment, the invention provides a process wherein said metallocene is a bridged metallocene selected from the group comprising diphenylmethylene (3-t-butyl-5-methyl-cyclopentadienyl) (4,6-di-t-butyl-fluorenyl) zirconium dichloride, di-p-chlorophenylmethylene (3-t-butyl-5-methyl-cyclopentadienyl) (4,6-di-t-butyl-fluorenyl) zirconium dichloride, diphenylmethylene (cyclopentadienyl)(fluoren-9-yl) zirconium dichloride, dimethylmethylene (cyclopentadienyl)(2,7-ditert-butyl-fluoren-9-yl) zirconium dichloride, dimethylmethylene [1-(4-tert-butyl-2-methyl-cyclopentadienyl)](fluoren-9-yl) zirconium dichloride, diphenylmethylene [1-(4-tert-butyl-2-methyl-cyclopentadienyl)] (2,7-ditert-butyl-fluoren-9-yl) zirconium dichloride, dimethylmethylene [1-(4-tert-butyl-2-methyl-cyclopentadienyl)] (3,6-ditert-butyl-fluoren-9-yl) zirconium dichloride dimethylmethylene (cyclopentadienyl)(fluoren-9-yl) zirconium dichloride and dibenzylmethylene(2,7-diphenyl-3,6-di-tert-butyl-fluoren-9-yl)(cyclopentadienyl)zirconium dichloride.

The support is treated with the metallocene, advantageously by mixing the desired metallocene(s) with the MAO-modified support. Preferably mixing occurs at room temperature for a duration of at least 15 min, preferably at least 1 hour, more preferably at least 2 hours.

In a particular embodiment, the invention provides a process wherein the molar ratio of aluminum, provided by the alumoxane, to transition metal, provided by the metallocene, of the polymerisation catalyst is between 20 and 200, and for instance between 30 and 150, or preferably between 30 and 100.

The details and embodiments mentioned above in connection with the process for manufacturing the catalyst support and the supported catalyst system also apply with respect to the olefin polymerisation method according to the present invention.

The olefin polymerisation (which includes homo- and copolymerisations) method of the present invention is preferably carried out in the liquid phase (i.e. known as "slurry phase" or "slurry process") or in the gas phase; or in the case of propylene polymerisation also in a bulk process. Combinations of different processes are also applicable.

In a slurry process, the liquid comprises the olefin, either propylene or ethylene, and where required one or more alpha-olefinic comonomers comprising from 2 to 10 carbon atoms, in an inert diluent. The comonomer may be selected from one or more alpha-olefins such as ethylene (for example when polymerising propylene), 1-butene, 1-hexene, 4-methyl 1-pentene, 1-heptene and 1-octene. Preferably, the comonomer selected is ethylene if polymerising propylene. Preferably, the comonomer selected is 1-hexene when polymerising ethylene. In either case, the inert diluent is preferably isobutane. Preferably, ethylene is polymerized in the presence of a metallocene catalyst system according to the invention in a double loop reactor, i.e. two slurry loop reactors connected in series. In this case, an increase of 100% activity was observed according to the invention in comparison with a non-titanated catalyst support.

The polymerisation process for ethylene is typically carried out at a polymerisation temperature of from 80 to 110° C. and under a pressure of at least 20 bars. Preferably, the temperature ranges from 85 to 110° C. and the pressure is at least 40 bars, more preferably from 40 to 42 bars.

The polymerisation process for propylene is typically carried out at a polymerisation temperature of from 60 to 110° C. and under a pressure of at least 20 bars. Preferably, the temperature ranges from 65 to 110° C., preferably 70° to 100° C., more preferably 65 to 78° C. and the pressure is at least 40 bars, more preferably from 40 to 42 bars.

Other compounds such as a metal alkyl or hydrogen may be introduced into the polymerisation reaction to regulate activity and polymer properties such as melt flow index. In one preferred process of the present invention, the polymerisation or copolymerisation process is carried out in a slurry reactor, e.g. in a liquid-full loop reactor.

The catalyst system of the invention is also particularly suited for gas phase polymerisations of olefins. Gas phase polymerisations can be performed in one or more fluidised bed or agitated bed reactors. The gas phase comprises the olefin to be polymerised, preferably ethylene or propylene, if required one or more alpha-olefinic comonomers comprising 2 to 10 carbon atoms, such as ethylene (for example when polymerising propylene), 1-butene, 1-hexene, 4-methyl-1-pentene, 1-octene or mixtures thereof and an inert gas such as nitrogen. Preferably, the comonomer selected is 1-hexene when polymerising ethylene. Preferably, the comonomer selected is ethylene if polymerising propylene. In either case, optionally a metal alkyl can also be injected in the polymerisation medium as well as one or more other reaction-controlling agents, for example, hydrogen. Reactor temperature can be adjusted to a temperature of from 60, 65, 70, 80, 85, 90 or 95° C. up to 100, 110, 112 or 115° C. (Report 1: Technology and Economic Evaluation, Chem Systems, January 1998). Optionally a hydrocarbon diluent such as pentane, isopentane, hexane, isohexane, cyclohexane or mixtures thereof can be used if the gas phase unit is run in the so-called condensing or super-condensing mode.

Polypropylene can also be obtained by using the metallocene catalyst system of the invention by polymerizing propylene in a bulk process, e.g. in a loop reactor (Spheripol®) or a continuous stirred-tank reactor (CSTR), or in a Spherizone® process i.e. a multi-zone circulating reactor. Combinations of the above types of processes are also applicable e.g. continuous stirred-tank reactor (CSTR) under bulk conditions, followed by a gas phase reactor.

Surprisingly, it was found that the supported catalyst system according to the invention greatly improves the catalytic activity of metallocene catalyst systems.

In one embodiment, it was found that the catalytic activity of a metallocene catalyst system for ethylene polymerisations even increased up to 70% by using the Ti-impregnated support according to the invention, in comparison with a non-titanated support.

Thus, the invention also covers the polyolefin as such obtainable using the supported catalyst system of the invention. When the catalyst system of the invention has a Ti content of 1 to 12 wt % based on the weight of the Ti-impregnated catalyst support, the polyolefin obtained therewith has an atomic molar ratio of Ti to the transition metal M i.e. Ti/M, wherein M is selected from one or more of zirconium, hafnium and vanadium, of 0.13 to 500. When the catalyst system of the invention has a Ti content of 1 to 10 wt % based on the weight of the titanated silica-containing catalyst support, the polyolefin obtained therewith preferably has a Ti/M atomic molar ratio of 1.3 to 420. The transition metal M indicates that the polyolefin was obtained in the presence of at least one metallocene. In addition, the Cl/Ti atomic molar ratio of the polyolefin should be less than 2.5. This indicates that the polyolefin was obtained in the absence of a Ziegler-Natta catalyst, since Ziegler-Natta catalysts include large amounts of Cl. The presence of Ti indicates the use of a Ti containing compound to boost catalytic activity of the metallocene.

Thus in another embodiment, the invention covers a polyolefin having a Ti/M atomic molar ratio of 0.13 to 500, preferably 1.3 to 420, wherein M is selected from one or more of zirconium, hafnium and vanadium, and preferably a Cl/Ti atomic molar ratio of less than 2.5.

The content of Ti and M of the polyolefin are measured by inductively coupled plasma atomic emission spectroscopy (ICP-AES) as is known in the art. The content of Cl is measured by XRF as is known in the art. Note that the measurements are made on the polyolefin obtained from the reactor (the fluff), prior to additivation and extrusion.

Such a Ti content allows the formation of a polyolefin using far less catalyst, due to the increased activity of the supported catalyst system in the presence of Ti. As a result, the polyolefin has a lower catalytic residue, which in turn improves its use in terms of health and safety (less catalytic residue to potentially migrate to the surface). Due to the increased activity, the polyolefins also have lower amounts of volatiles, because monomer and optional comonomer are more efficiently incorporated.

Thus the polyolefin obtained using the supported catalyst system of the invention is particular suitable for applications requiring good organoleptic properties e.g. for food and drink packaging.

When polymerising ethylene, the polyethylene obtained with the catalyst system of this invention can have a molecular weight distribution (MWD) that is represented by the dispersion index D i.e. Mw/Mn (weight average molecular weight/number average molecular weight, measured by GPC analysis) of typically from 2 to 10, more typically of 3 to 8, a density measured according to ISO 1183 typically from 0.920 up to 0.970 g/cm$^3$ and a melt flow index (MI$_2$) measured according to ISO 1133, condition D, at 190° C. and 2.16 kg typically from 0.1 to 50 g/10 min, preferably 0.1 to 30 g/10 min.

When polymerising propylene, the polypropylene obtained with the catalyst system of this invention can have a density measured according to ISO 1183 typically from 0.920 up to 0.970 g/cm$^3$ and a melt flow index (MI$_2$) measured according to ISO 1133, condition L, at 230° C. and 2.16 kg, in the range from 0.05 g/10 min to 2000 g/10 min.

The polyolefins obtained using the catalyst system of the invention can be used in any application known to the person skilled in the art.

The following Examples are given to illustrate the invention without limiting its scope.

EXAMPLES

Supported Catalyst System "Catalyst Z 1"
1. Support Modification
In a 250 mL round bottom flask conditioned under a light nitrogen flow, 25 g of silica was stirred at 60 rpm and dried at 110° C. overnight. 190 mL of dry hexane was then added. The suspension was cooled at 0° C. and 3.2 mL of VertecBip (20:80 weight ratio of Ti(OC$_4$H$_9$)$_4$ to Ti(OC$_3$H$_7$)$_4$) was added dropwise to impregnate the support. The suspension was mixed for 20 hours at 0° C. The solvent was removed under reduced pressure and the resulting silica was dried under a nitrogen flow at 450° C. for 4 hours. The Ti-impregnated silica had a Ti content of 2 wt %.

2. MAO Treatment
20 g of dried silica was introduced in a 500 mL round-bottomed flask. Toluene was added and the suspension was stirred at 100 rpm. MAO (30 wt. % in toluene) was dropwise added via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane before being dried under reduced pressure overnight 3. Metallocene Treatment In 250 mL round bottom flask, 9.8 g of the above-obtained SMAO silica was suspended in 80 mL toluene. Then, 0.2 g of ethylene-bis(4,5,6,7-tetrahydro-1-indenyl) zirconium dichloride in a suspension of 20 mL of toluene was added to the suspended silica-containing support. The resulting suspension was stirred at 100 rpm for 2 hours at room temperature. Finally, the obtained catalyst was filtered, washed with toluene and pentane before being dried overnight.

Supported Catalyst System "Catalyst Z 2"

1. Support Modification

In a 250 mL round bottom flask conditioned under a light nitrogen flow, 25 g of silica was stirred at 60 rpm and dried at 110° C. overnight. 190 mL of dry hexane was then added. The suspension was cooled at 0° C. and 6.4 mL of VertecBip (20:80 weight ratio of $Ti(OC_4H_9)_4$ to $Ti(OC_3H_7)_4$) was added dropwise to impregnate the support. The suspension was mixed for 20 hours at 0° C. The solvent was removed under reduced pressure and the resulting silica was dried under a nitrogen flow at 450° C. for 4 hours. The Ti-impregnated silica had a Ti content of 4 wt %.

2. MAO Treatment 20 g of dried silica was introduced in a 500 mL round-bottomed flask. Toluene was added and the suspension was stirred at 100 rpm. MAO (30 wt. % in toluene) was dropwise added via a dropping funnel and the resulting suspension was heated at 110° C. (reflux) for 4 hours. The amount of added MAO was calculated to reach the desired Al loading. After the reflux, the suspension was cooled down to room temperature and the mixture was filtered through a glass frit. The recovered powder was washed with toluene and pentane before being dried under reduced pressure overnight 3. Metallocene Treatment In 250 mL round bottom flask, 9.8 g of the above-obtained SMAO silica was suspended in 80 mL toluene. Then, 0.2 g of ethylene-bis(4,5,6,7-tetrahydro-1-indenyl) zirconium dichloride in a suspension of 20 mL of toluene was added to the suspended silica-containing support. The resulting suspension was stirred at 100 rpm for 2 hours at room temperature. Finally, the obtained catalyst was filtered, washed with toluene and pentane before being dried overnight.

"Catalyst Z1" a Ti content of 1.5 wt % Ti and a Ti/Zr atomic molar ratio of 3.07.

"Catalyst Z2" a Ti content of 3 wt % Ti and a Ti/Zr atomic molar ratio of 6.14.

The content of Cl was below the detection limit, only trace amounts present.

The content of Ti, Zr and Cl were measured using XRF.

Supported catalyst system "Catalyst C1"

1. Support Modification

Silica support was dried under a nitrogen flow at 450° C.

2. MAO Treatment

MAO was mixed in toluene with the modified support at 110° C. After filtration, the recovered powder was washed and dried overnight to obtain the MAO-modified support.

3. Metallocene Treatment

The metallocene ethylene-bis(4,5,6,7-tetrahydro-1-indenyl) zirconium dichloride was stirred with the MAO-modified support at room temperature for 2 hours. After filtration, the recovered powder was washed and dried overnight to obtain the supported catalyst system. No titanation was carried out.

Polymerisations

Polymerisations of ethylene were carried out with "Catalyst Z1" and "Catalyst Z2" and compared with polymerisations of ethylene using "Catalyst C1" under the same reaction conditions.

The catalyst system was injected in a 130 mL reactor containing 75 mL of isobutane under an ethylene pressure of 23.8 bars at 85° C. for copolymerization with a concentration of 2.4 wt. % hexene.

FIG. 1 shows the comparison of the catalytic activity between the different runs, "Catalyst C1" being the comparative example. As presented, the impregnation of the support according to the invention provides increased activities. A weight percentage of only 2 and 4 wt % of Ti increased the catalytic activity by 45% and 36% respectively, compared to the Catalyst C1.

The polyethylene obtained with "Catalyst Z1" had a Ti/Zr atomic molar ratio of 3.07. The polyethylene obtained with "Catalyst Z2" had a Ti/Zr atomic molar ratio of 6.14.

The content of Cl was below the detection limit as measured by XRF, only trace amounts present. Si content was measured using XRF as well.

The content of Ti and Zr were measured using ICP-AES.

Catalytic residues were measured as follows:

| | PE using CATALYST Z1 (invention) | PE using CATALYST C1 (comparative) |
| --- | --- | --- |
| Si/ppm | 286.8 | 403 |
| Ti/ppm | 1.86 | No Ti |
| Zr/ppm | 0.78 | 1.1 |

Thus the catalytic residue in the polyethylene according to the invention using "Catalyst Z1" was less than the polyethylene obtained using "Catalyst C1" indicating that titanium impregnated homogeneously throughout the catalyst grain greatly increased the catalytic activity of the metallocene.

Polymerisations of ethylene were carried out with "Catalyst Z 1" and compared with polymerisations of ethylene using "Catalyst C1" on an ADL (Advanced Double Loop) process. Catalyst Z1 showed 100% higher catalyst activity in comparison to "Catalyst C1".

The invention claimed is:

1. A process for preparing a polyolefin comprising polymerizing an olefin in the presence of a supported catalyst system to form a polyolefin having an atomic molar ratio of Ti/M of from 0.13 to 500, wherein M is a transition metal selected from one or more of zirconium, hafnium and vanadium, and an atomic molar ratio of Cl/Ti of less than 2.5, wherein the supported catalyst system is prepared by a process comprising:

impregnating a silica-containing catalyst support having a specific surface area of from 150 $m^2$/g to 800 $m^2$/g, with a mixture of titanium compounds of the general formula $R_nTi(OR')_m$ or $(RO)_nTi(OR')_m$, wherein R and R' are the same or different and are selected from hydrocarbyl groups containing from 1 to 12 carbon and halogens, and wherein n is 0 to 4, m is 0 to 4 and m+n equals 4, to form a titanated silica-containing catalyst support having a Ti content of at least 0.1 wt % based on the weight of the Ti-impregnated catalyst support;

wherein the supported catalyst system further comprises an alumoxane and a metallocene, and wherein the metallocene comprises a transition metal;

ii). drying the Ti-impregnated catalyst support prior to the addition of alumoxane and metallocene on the Ti-impregnated catalyst support;

iii). adding the alumoxane on the Ti-impregnated catalyst support prior to or during the addition of metallocene;

wherein the molar ratio of aluminum from the alumoxane to transition metal of the supported catalyst system is between 30 and 100.

2. The process according to claim 1, wherein polymerization is carried out: in a gas phase process and/or in a slurry phase process.

3. The process according to claim 1, wherein the olefin is ethylene.

4. The process according to claim 1, wherein the olefin is propylene, optionally copolymerised with an alpha-olefin comonomer having from 4 to 10 carbon atoms or ethylene, wherein polymerisation is carried out in a bulk process.

5. The process according to claim 1, wherein the titanated silica-containing catalyst support has a Ti content of 0.1 to 60 wt % based on the weight of the Ti-impregnated catalyst support.

6. The process according to claim 1, wherein the titanated silica-containing catalyst support has a Ti content of 0.1 to 12 wt % based on the weight of Ti-impregnated catalyst support and an atomic molar ratio Ti/M, wherein M is a transition metal selected from one or more of zirconium, hafnium and vanadium, of 0.13 to 500.

7. The process according to claim 1, wherein the titanium compounds in the mixture of titanium compounds are selected from the group consisting of tetraalkoxides of titanium having the general formula $Ti(OR')_4$ wherein each R' is the same or different and is an alkyl or cycloalkyl group each having from 3 to 5 carbon atoms.

8. The process according to claim 1, wherein the titanium compounds in the mixture of titanium compounds comprise $Ti(OC_4H_9)_4$ and $Ti(OC_3H_7)_4$, and wherein the ratio of $Ti(OC_4H_9)_4$ and $Ti(OC_3H_7)_4$ is about 20/80.

9. The process according to claim 1, wherein the alumoxane is methylaluminoxane (MAO).

10. The process according to claim 1, wherein the metallocene is selected from formula (I) or (II):

$(Ar)_2MQ_2$            (I)

$R''(Ar)_2MQ_2$            (II)

wherein the metallocenes according to formula (I) are non-bridged metallocenes and the metallocenes according to formula (II) are bridged metallocenes;

wherein said metallocene according to formula (I) or (II) has two Ar bound to M which are the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of hydrogen, halogen and a hydrocarbyl having 1 to 20 carbon atoms and wherein said hydrocarbyl optionally contains one or more atoms selected from the group comprising B, Si, S, O, F and P;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F and P; and wherein R'' is a divalent group or moiety bridging the two Ar groups and selected from the group consisting of a $C_1$-$C_{20}$ alkylene, a germanium, a silicon, a siloxane, an alkylphosphine and an amine, and wherein said R'' is optionally substituted with one or more substituents each independently selected from the group comprising a hydrocarbyl having 1 to 20 carbon atoms and wherein said hydrocarbyl optionally contains one or more atoms selected from the group comprising B, Si, S, O, F and P.

11. The process according to claim 10, wherein each Ar is selected independently from an indenyl or a tetrahydroindenyl.

12. The process according to claim 1, wherein the alumoxane is an oligomeric, linear or cyclic alumoxane selected from

R—(Al(R)—O)$_x$—AlR$_2$    (III) for oligomeric, linear alumoxanes; or

(—Al(R)—O—)$_y$         (IV) for oligomeric, cyclic alumoxanes wherein x is 1-40; wherein y is 3-40; and wherein each R is independently selected from a $C_1$-$C_8$ alkyl.

13. The process according to claim 1, wherein the titanium compounds in the mixture of titanium compounds are selected from the group consisting of tetraalkoxides of titanium having the general formula $Ti(OR')_4$;

wherein each R' is the same or different, wherein each R' is an alkyl group having from 3 to 5 carbon atoms, a cycloalkyl group having from 3 to 5 carbon atoms, or mixtures thereof;

wherein the impregnation of the support by the mixture of titanium compounds is performed by introducing the mixture of titanium compounds in the form of a suspension in a diluent, or by introducing the mixture of titanium compounds dissolved in an aqueous solvent.

14. The process according to claim 1, wherein the mixture of titanium compounds comprises $Ti(OC_4H_9)_4$ or $Ti(OC_3H_7)_4$.

15. The process according to claim 1, wherein the titanium compounds in the mixture of titanium compounds are of the general formula $R_nTi(OR')_m$, wherein R and R' are the same or different and are selected from hydrocarbyl groups containing from 1 to 12 carbon and halogens, and wherein n is 0 to 4, m is 0 to 4 and m+n equals 4.

16. The process according to claim 1, wherein the titanium compounds in the mixture of titanium compounds are of the general formula $(RO)_nTi(OR')_m$, wherein R and R' are the same or different and are selected from hydrocarbyl groups containing from 1 to 12 carbon and halogens, and wherein n is 0 to 4, m is 0 to 4 and m+n equals 4.

17. The process according to claim 1, wherein impregnation of the silica-containing catalyst support with the mixture of titanium compounds forms Si—O—Ti—OH on a surface of pores within the silica-containing catalyst support prior to addition of the alumoxane to the Ti-impregnated catalyst support.

18. The process according to claim 17, wherein drying the Ti-impregnated catalyst support prior to the addition of alumoxane and metallocene on the Ti-impregnated catalyst support comprises heating the Ti-impregnated catalyst support to a temperature of at least 100° C. in an atmosphere of dry and inert gas, air, or combinations thereof.

19. The process according to claim 1, wherein adding the alumoxane to the Ti-impregnated catalyst support comprises mixing the alumoxane in an inert diluent or solvent with the Ti-impregnated catalyst support, wherein deposition of the alumoxane on the Ti-impregnated catalyst support occurs at a temperature between 60° C. and 120° C.

20. The process of according to claim 1, wherein the alumoxane is added on the Ti-impregnated catalyst support prior to addition of metallocene, and wherein adding the metallocene to the Ti-impregnated catalyst support comprises mixing the metallocene with the Ti-impregnated catalyst support.

21. The process according to claim 1, wherein the mixture of titanium compounds is a mixture of alkyl titanates.

22. The process according to claim 1, wherein the impregnation of the support by the mixture of titanium compounds is performed by introducing the mixture of titanium compounds in the form of a suspension in a diluent.

23. The process according to claim 1, wherein the impregnation of the support by the mixture of titanium compounds is performed by introducing the mixture of titanium compounds dissolved in an aqueous solvent.

24. The process according to claim 1, wherein the metallocene is selected from the group consisting of bis(cyclopentadienyl) zirconium dichloride, bis(tetrahydroindenyl) zirconium dichloride, bis(indenyl) zirconium dichloride, and bis(1-methyl-3-butyl-cyclopentadienyl)zirconium dichloride.

25. The process according to claim 1, wherein the metallocene is selected from the group consisting of ethylenebis (4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, dimethylsilylene bis(2-methyl-1H-cyclopenta[a]naphthalen-3-yl) zirconium dichloride, cyclohexylmethylsilylene bis[4-(4-tert-butylphenyl)-2-methyl-inden-1-yl] zirconium dichloride, and dimethylsilylene bis[4-(4-tert-butylphenyl)-2-(cyclohexylmethyl)inden-1-yl] zirconium dichloride.

26. The process according to claim 25, wherein the metallocene is ethylenebis(4,5,6,7-tetrahydro-1-indenyl) zirconium dichloride.

27. The process according to claim 1, wherein the metallocene is diphenylmethylene (3-t-butyl-5-methyl-cyclopentadienyl) (4,6-di-t-butyl-fluorenyl) zirconium dichloride, di-p-chlorophenylmethylene (3-t-butyl-5-methyl-cyclopentadienyl) (4,6-di-t-butyl-fluorenyl) zirconium dichloride, diphenylmethylene (cyclopentadienyl)(fluoren-9-yl) zirconium dichloride, dimethylmethylene (cyclopentadienyl)(2,7-ditert-butyl-fluoren-9-yl) zirconium dichloride, dimethylmethylene [1-(4-tert-butyl-2-methyl-cyclopentadienyl)] (fluoren-9-yl) zirconium dichloride, diphenylmethylene [1-(4-tert-butyl-2-methyl-cyclopentadienyl)] (2,7-di-tert-butyl-fluoren-9-yl) zirconium dichloride, dimethylmethylene [1-(4-tert-butyl-2-methyl-cyclopentadienyl)] (3,6-di-tert-butyl-fluoren-9-yl) zirconium dichloride dimethylmethylene (cyclopentadienyl)(fluoren-9-yl)zirconium dichloride or dibenzylmethylene (2,7-diphenyl-3,6-di-tert-butyl-fluoren-9-yl)(cyclopentadienyl)zirconium dichloride.

* * * * *